Figure 3:
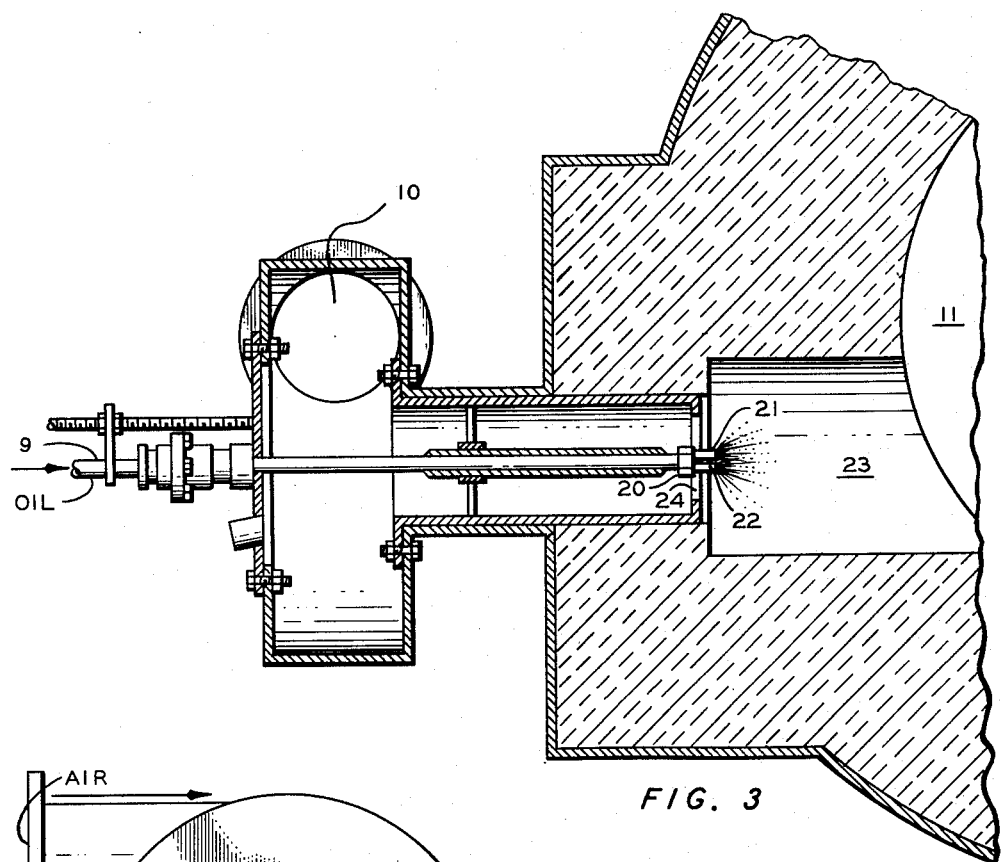

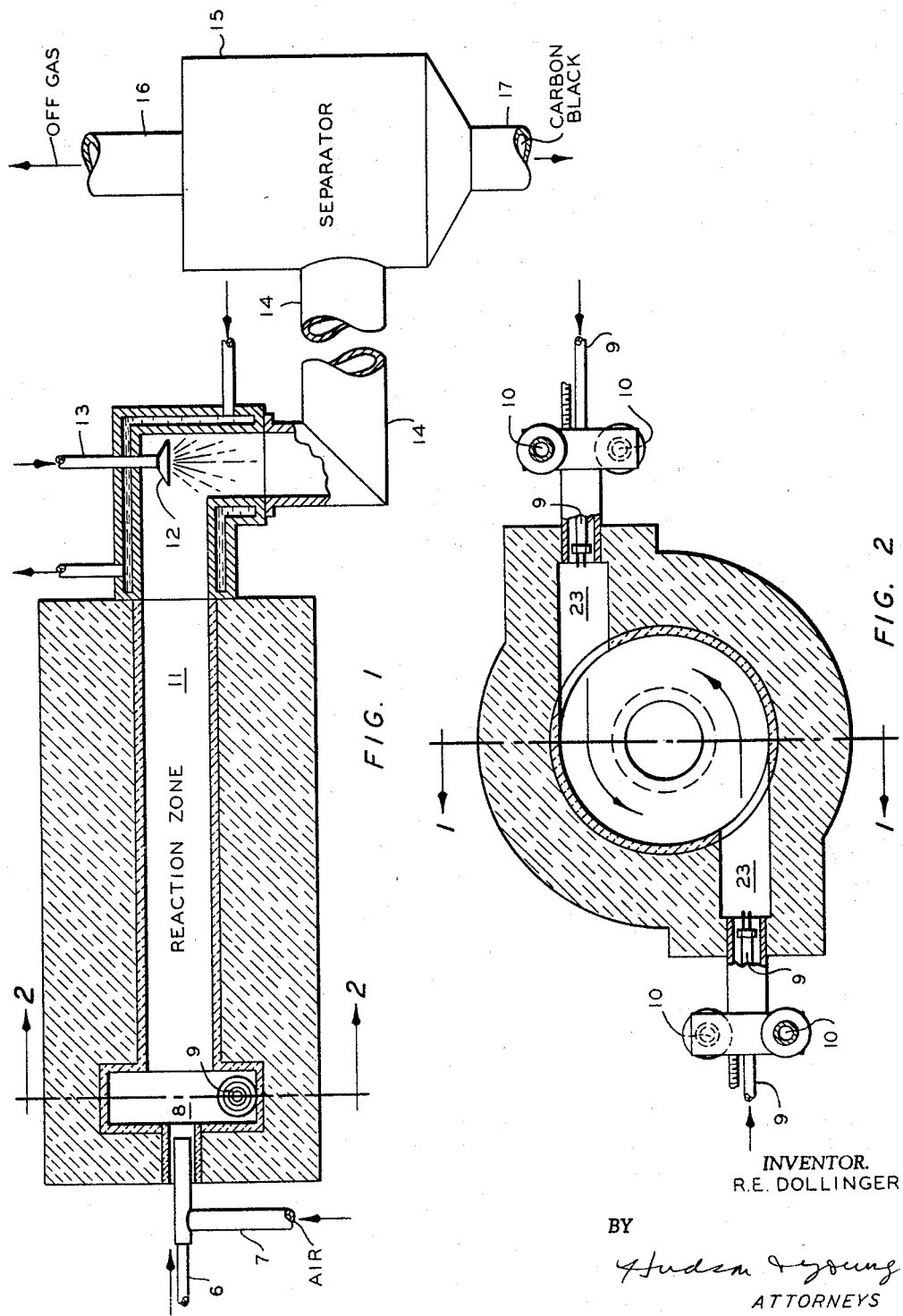

INVENTOR.
R.E. DOLLINGER

2,961,300
CARBON BLACK FURNACE AND OPERATION

Robert E. Dollinger, Phillips, Tex., assignor to Phillips Petroleum Company, a corporation of Delaware Filed May 8, 1958, Ser. No. 733,885

17 Claims. (Cl. 23—209.4)

This invention relates to an improved carbon black furnace and to an improved carbon black producing operation. In one of its aspects, the invention relates to the increasing of throughput in a precombustion-type carbon black furnace employing tangentially introduced fuel without loss of stabilized combustion conditions by increasing the number of sprays through which the tangential fuel is introduced into the tangential combustion tunnel or tunnels. In another of its aspects, the invention relates to a precombustion-type carbon black furnace or reactor in which there is provided in the tangential combustion tunnel or tunnels a fuel injector means which is provided with at least two nozzles, which can be fed by a single feed pipe, the nozzles being positioned close together about the injector axis to provide intersecting atomized oil spray cones which do not impinge on refractory walls in said tunnel or tunnels.

The construction and operation of precombustion-type carbon black furnaces is well known in the art. Patent 2,564,700, issued to J. C. Krejci and dated August 21, 1951, describes in detail such construction and operation. Briefly, a precombustion-type furnace comprises a generally cylindrical precombustion zone, generally having a greater diameter than length, and a coaxially disposed reaction zone attached to and in open communication with the precombustion zone, the length of the reaction zone being greater than its diameter. One or more, usually two, tunnels are disposed around the periphery of and tangentially communicate with the precombustion zone. The other end of the reaction zone is connected to equipment for cooling the effluent from the furnace and for collecting the carbon black. Such a furnace together with some of the auxiliary equipment is shown in Figure 1.

In operation, a fuel, which may be gas or oil, is burned in the tangential tunnels. The hot combustion gases tangentially enter the precombustion zone. This hot combustion gas travels in a generally spiral path toward the axis of the precombustion zone, and is then directed into the reaction zone, through which it flows in a generally helical path adjacent the walls of the zone. The material from which the carbon black is to be produced, usually an aromatic gas oil and generally referred to as "axial oil," is fed through an axially disposed tube into the precombustion zone, where it is rapidly heated to a carbon black-forming temperature by heat exchange with the helically moving combustion gas. The axial feed is reacted within the reaction zone to form carbon black, which is subsequently recovered. Combustion in the tangential tunnels is usually carried out with air-fuel mixtures slightly leaner than stoichiometric. In addition, in order to cool the axial oil tube and to prevent carbon deposition thereon, a relatively small amount of air or steam is fed through an annular space formed between the oil tube and a surrounding pipe. Thus, oxidizing gases are present in the precombustion zone, and these result in the combustion of a small amount of the axial oil feed. However, the amount of heat derived from this source is very small in comparison with that derived from the combustion of fuel in the tangential tunnels. Operation of the reactor is controlled by setting the flow of tangential air-gas or air-oil mixture and then adjusting the axial oil rate to produce the desired carbon black, usually as judged by the well-known Photelometer test.

Other related carbon-black forming operations are described and claimed in U.S. Patents 2,375,795, 2,375,796, 2,375,797, and 2,375,798 (1945).

Control of furnace operation by varying the axial oil rate to produce a black of, say 90 photelometer, helps to assure that the black will be sufficiently tar-free but not excessively after-treated (i.e., is not excessively modified after formation by the hot gases in the reactor). Assuming a satisfactory photelometer value, the quality of a black with respect to the reinforcement which the black can impart to rubber, even the type (HAF, ISAF, or SAF) of black produced, is determined by reactor design and throughput of tangential air. As the amount of tangential air is increased, the axial oil rate to produce the desired photelometer is increased. This results in a desirable increase in reactor capacity and, if the increase in air rate is sufficient, in a more highly reinforcing black.

In the operation of such a carbon black furnace or reactor as has been described, using a heavier fuel, more aromatic than a light cycle oil with a Bureau of Mines Correlation Index of 36, such as "Enjay" aromatic oil, as the tangentially introduced fuel or oil, while seeking to maintain a desired high throughput, unstable combustion of the fuel in the tangential tunnels was observed. Indeed, the combustion was so unstable that the reactor roared intermittently indicating the unstable combustion conditions. Upon shutdown, carbon deposits were discovered in the tangential tunnels. It appears that the heavier, more aromatic oil influenced greatly the flame characteristics and caused the unstable combustion and the carbon deposition.

In an effort to maintain the same throughput of tangentially introduced oil but to reduce the carbon formation and other observed characteristics, which have been noted, it was first conceived that a plurality of sprays for introducing the aromatic oil into the tunnels might result in greater control of the spray pattern. It was, however, believed and expected, if a plurality of sprays were adopted, that at the point of contact of the atomized cones, the particles of oil would impinge on each other coalescing into large droplets which would not burn in the tunnels to the extent desired. Therefore, it was thought that coalescing would cause additional operational difficulties. Nevertheless, two Monarch 35 g.p.h. 80° PLP nozzles as used in a 12-inch tunnel in a carbon black reactor were welded together to a common connection and this connection welded to the oil induction tube of the burner. The spray pattern obtained was excellent. The two spray cones or patterns obtained appeared to interlace perfectly and the resulting atomization which was obtained had an appearance similar to that obtained from a single spray. It was found upon installation and actual operation of the double spray system that extremely stable combustion could be obtained. Upon shutdown, no carbon deposits were found. Furthermore, testing of the product carbon black indicated no significant adverse effect was obtained by substituting the plurality of sprays for the erstwhile single spray in the combustion tunnels.

It is an object of this invention to provide an improved carbon black furnace. It is also an object of this invention to provide an improved carbon black producing operation. In a further object of the invention, there are provided a method and means permitting an increase of throughput in a precombustion-type carbon black producing reactor, without loss of stabilized combustion conditions in the tangential combustion zones or tunnels, especially when using a heavier, more aromatic fuel, as described. Generally, as an object of the invention, there is provided an improved tangential fuel introduction system in a precombustion-type carbon black furnace.

Other aspects, objects, and several advantages of this invention are apparent from a study of this disclosure, the drawings and the appended claims.

According to the present invention, there are provided an improved carbon black furnace and carbon black-producing operation which comprises in a precombustion-type furnace, and operation, in which oil is used as tangential fuel, introducing the tangentially supplied fuel to each of the combustion tunnels or zones of the precombustion zone through a plurality of sprays as described herein in more detail.

Figure 4:
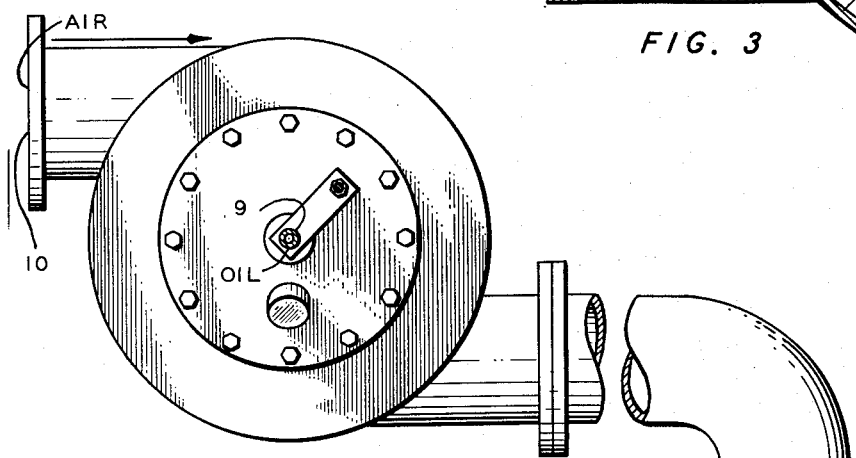
Figure 5:
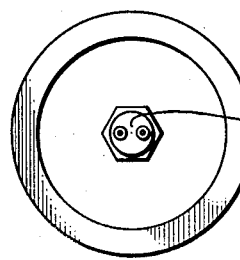

Figure 1 shows substantially in cross-sectional elevation the general type of carbon black furnace arrangement to which the present invention is applied. Figure 2 is a cut of Figure 1 taken along the line 2—2 showing the general arrangement of the tangential burners. Figure 3 is an enlarged, more detailed view of a section of Figure 2 showing the general arrangements of a double spray nozzle in one of the tunnels of the furnace. Figure 4 is an end view of Figure 3 viewed from the oil inlet end (left-hand side of Figure 3) showing tangential air inlets around the axially disposed oil feed pipe. Figure 5 is an end view of the nozzle sprays as viewed from within the tunnel on the right-hand side of Figure 3.

In a run, described later herein, preheated tar at a temperature of 550° F. was fed through pipe 6 and sprayed into precombustion zone 8. Axial steam was fed through pipe 7 to prevent carbon deposition in pipe 7 and its nozzle. This precombustion zone or chamber was 12 inches in length and 37 inches in diameter. The tangential oil was introduced through pipe 9 together with air, introduced at 10, into tunnels 23, as later described in more detail. The combustion of the tangentially introduced oil was substantially completed in tangentially disposed tunnels 23, as later described in connection with the remaining figures. The tangentially introduced combustion gases, after rotating in zone 8, travelled from chamber 8 into chamber 11 surrounding, and in part mixing with, the axially introduced tar in both chambers. Some of the gases mix with the tar, thereby providing most of the heat required to form the carbon black. The tangentially introduced combustion gases, which passed from chamber 8 into chamber 11, moved helically around the feed in chamber 11. In chamber 11, carbon black was produced as the gases travelled toward the other end of the apparatus. The helically moving gases prevented carbon deposition in the reaction zone. A water spray 12 furnished with water by way of pipe 13 cooled the combustion gases and carbon black produced therein to a desired lower temperature below approximately 1250° F. From the water cooling zone, the gases and carbon black passed through pipe 14 to a carbon black separating means 15 from which off-gas was separated by way of pipe 16 and carbon black recovered by way of pipe 17. As earlier indicated, details of the type of furnace here described and its operations are known to the art. Reference is made to earlier mentioned U.S. Patent 2,564,700, issued August 21, 1951, J. C. Krejci, for further details which one skilled in the art can now routinely apply in the construction and operation of such a furnace. Further and related information regarding carbon black furnace operations is given in copending Serial No. 594,983, filed June 29, 1956.

The present invention is concerned as indicated herein, with maintaining stable combustion conditions in the tunnel or tunnels supplying combustion gases to the precombustion zone when said gases are produced using an oil as herein described.

Referring now to Figures 2, 3 and 4, air introduced at 10 was fed rotatingly around tangential fuel introduction pipe 9. The nozzle at the discharge end of pipe 9 at 20 was equipped with two spray orifices or elements 21 and 22, respectively, welded together as earlier described. The drawings show elements 21 and 22 closely spaced together and the resulting spray pattern obtained. It will be noted that as a feature of the invention, the rotating stream of air moves helically past the nozzles and aids in producing the desired shape of the flame in the tunnel 23. One skilled in the art will understand that the relative sizes of the nozzles, the rate of air flow, and the size of orifice 24 will affect the spray and flame patterns. Primarily, the air moving as described ensures a stable flame front and, therefore, smoother combustion. This pattern, according to the invention, permitted stabilized combustion conditions even under increased rates of introduction of fuel into tunnels 23 from which substantially completely burned fuel oil or combustion gases entered chamber 8 and, after rotating in chamber 8, passed into reaction zone 11. The tunnels 23 were 12 inches in diameter and 10 inches long measured at shortest length. The spray nozzles were located just about at the upstream end of the tunnels as shown in the drawing.

Although in this specific example, in Figure 3, two sprays are shown welded together to a common connection, it is clearly within the scope of the invention to weld more than two such sprays together or to provide two such sprays in juxta-position fed by separate feed pipes. Furthermore, in lieu of the two sprays shown, sprays of other type can be employed.

While one spray at eighty gallons per hour does not produce as good or stable combustion as it does at a lower capacity, two sprays of forty gallons per hour each were found to produce stable combustion. Thus, a larger number of finer droplets were believed obtained using two sprays than by using one spray and the spray pattern was very good.

The invention is applicable to all sizes of precombustion type reactors. In the case of 12-inch diameter tunnels, the lower limit on the double spray feed is approximately fifty gallons per hour of fuel oil per tunnel and 105,000 cubic feet per hour of air per tunnel. Similarly, the upper limit for 12-inch tunnels on the double spray feed, with sufficient air pressure to get the material through the tunnel and reactor, is approximately 100 gallons per hour of fuel oil per tunnel and 210,000 cubic feet per hour of air per tunnel. Substantially beyond the limit given, a larger tunnel would be required and preferably there would be employed three or more sprays. As the tunnel diameter size increases, the values for the limits given also increase. Generally, larger tunnel sizes make for more stable combustion for the same throughput while smaller tunnel sizes make for less stable combustion for the same throughput. The number of sprays is found to affect the limit of the throughput. Thus, were unstable combustion with two sprays is observed, stable combustion usually can be obtained with three sprays.

As earlier noted, the arrangement in spacing of the atomizing oil nozzles is such that the discharges therefrom are parallel to the burner axis and as close to each other as is practically possible. However, there may be, say, two inches between the nozzles in a 12-inch diameter tunnel. The limiting spacing is readily determined by the formation of carbon and/or oil in the tunnel. The atomizing oil nozzles can be located from approximately three inches back of orifice 24 (see Figure 3) to about four inches past orifice 24 in a 12-inch tunnel which is 10 inches long measured along its shortest length and is in communication with a precombustion chamber 37 inches in diameter.

At a constant air rate, decreasing tunnel diameter size will require closer spacing of the nozzles. Increasing tunnel diameter size will permit wider spacing of the nozzles. At constant tunnel sizes, higher air rates require closer spacing of nozzles whereas at lower air rates, wider spacing of nozzles is practicable.

The reactor described was adjusted to produce "Philblack E." "Philblack E" is a trademark for a commercially available high abrasion furnace carbon black. See the tables which follow later. An S-2 tar as axial feed stock and an "Enjay" aromatic oil as tangential fuel, described in Table I, were used. The use of the "Enjay" aromatic fuel caused the reactor to roar intermittently, and upon shutdown, carbon deposits were observed in the tangential tunnels. The data obtained during this run are found in Table II under run No. 1. Thereafter, two 35-gallon per hour Monarch PLP sprays were welded together to a common connection and this in turn welded to the oil induction tube of the burner. The spray pattern obtained was excellent. The two spray patterns interlaced perfectly and the resulting atomization looked similar to that obtained from one properly operating spray. Another run was made. The data are reported in Table II under run No. 2. Combustion was quite stable and more complete than with any single nozzle tested. This was particularly evidenced by the fact that tunnel pressure increased to the point where it was impossible to obtain 290,000 cubic feet per hour tangential air rate with the pressure of the air supply then available. The air rate which could be maintained using the available air pressure supply of 5.75 pounds per square inch gauge was a flow of 275,000 cubic feet per hour at the metering orifices. Upon shutdown, no carbon deposits were found.

From the foregoing, it is evident that the invention has provided an improved atomizing oil nozzle arrangement for tangential oil burners of precombustion-type carbon black reactors. Also, it is evident that the use of two or more atomizing oil nozzles in parallel for the tangential oil burner or burners resulted in smoother burning and elimination of carbon deposition in the tunnels even though high rates of oil flow were employed.

Other full-cone nozzles, having a wide angle, in the approximate range of 60–100°, can be used within the scope of the invention. Two specific nozzles now available which fall within the scope of the invention are Spray Engineering Company's 2-B spray nozzles and Spraying Systems Corporation's GG-2 Fulljet spray. See Catalog No. 24, Spraying Systems Company, Bellwood, Illinois, and Bulletin 702, Spray Engineering Company, Somerville, Mass.

It will be evident to those skilled in this art in possession of this disclosure that certain minor adjustments in operating conditions can be made responsive to tests upon the final product to obtain necessary surface area characteristics of the product or other characteristics of the product. Thus, it is known that to obtain the desired specific product characteristics from a carbon black furnace, it is necessary to adjust several different conditions to certain related values. Such adjustments are within the scope of the invention here described and can be made by said person skilled in the art without departing from the scope of the present invention.

TABLE I
Properties of oils

|  | Axial Feedstocks | | Tangential Fuel |
|---|---|---|---|
| Oil Number | F-90 | F-93 | B-211 |
| Oil Designation | S-2 | S-2 | Enjay Aromatic |
| A.P.I. Gravity | 0.8 | 0.9 | 19.5 |
| B. of M. Correlation Index | 122.3 | 122.0 | 76.8 |
|  | Vacuum Distillation | | ASTM Distillation D-158 |
| Volume percent OH at 760 mm.: | | | |
| 0 | 527 | 553 | 463 |
| 5 | 551 | 586 | 491 |
| 10 | 568 | 598 | 499 |
| 20 | 595 | 617 | 504 |
| 30 | 635 | 641 | 509 |
| 40 | 678 | 672 | 513 |
| 50 | 748 | 729 | 518 |
| 60 | 783 | 776 | 523 |
| 70 | crack | crack | 529 |
| 80 |  |  | 537 |
| 90 |  |  | 548 |
| 95 |  |  | 560 |
| EP |  |  | 585 |
| rec |  |  | 98.0 |
| res |  |  | 1.9 |
| Viscosity: | | | |
| SUS 100 F |  |  | 36.93 |
| SUS 122 F | 305.9 | 374.1 |  |
| SUS 210 F | 135.8 | 142.0 | 29.99 |
| BS & W, Volume Percent | 0.4 | 0.2 | 0.05 |
| Pour Point, F | 70 | 70 | −25 |
| Aniline Point, F |  |  | 66.2 |
| Ramsbottom Carbon Residue, Wt. Percent | 15.26 | 15.93 | 0.6 |
| Pentane Insoluble, Wt. Percent | 34.8 | 26.69 |  |
| Refractive Index, 20/D |  |  | 1.5383 |
| Carbon, Wt. Percent | 91.2 | 91.4 | 89.4 |
| Hydrogen, Wt. Percent | 8.6 | 8.2 | 10.4 |
| Sulfur, Wt. Percent | 0.37 | 0.36 | 0.2 |

The tangential fuel, i.e., the Enjay Aromatic of column 3 of Table I, as can be noted from the Bureau of Mines Correlation Index, the fourth property of Table I, is not nearly so aromatic as the S-2 fuel.

TABLE II
Reactor operating data for runs producing SAF carbon black

| Run No. | 1 | 2 |
|---|---|---|
| Reactor | Figure 1 | Figure 1. |
| Burners and tangential oil inlet system | Figure 3–one | Figure 3. |
| Axial Oil Feed | F-90 (Table I) | F-93 (Table I). |
| Rate, U.S. Gal./hr | 255 | 242.2. |
| Preheat, °F | 565 | 555. |
| Tangential Feed: | | |
| Fuel Oil Number | B-211 (Table I) | B-211 (Table I). |
| Rate, U.S. Gal./hr | 140.2 | 133.2. |
| Precombustion Chamber Length, in | 6 | 6. |
| Burner Pressure, in. Hg [1] | 10.9 | 10.6. |
| Cooling Line Pressure, in. Hg.[2] | 1.3 | 1.1. |
| Tangential Air Rate, M c.f.h | 290 | 275. |
| Jacket Steam Rate, M c.f.h | 6 | 10. |
| Photelometer | 90 | 91. |
| Calc. Pilot Plant Yield, lb./U.S. gal. | 3.64 | 3.68. |
| Grit 325 Mesh, Percent | 0.02 | .01. |
| Nitrogen Surface Area, sq. m./g | 133.8 | 135.6. |

[1] Pressure measured immediately upstream of tangential air drum.
[2] Pressure measured at outlet of refractory-lined quencher.

Reasonable variation and modification are possible within the scope of the foregoing disclosure, the drawings and the appended claims to the invention, the essence of which is that in a carbon black furnace of the precombustion type using an oil as tangential fuel, the tangential fuel oil introduction is accomplished through a plurality of substantially parallel-spaced nozzles closely adjacent each to the other in the tangential combustion tunnels of the furnace.

I claim:
1. In a carbon black furnace of the precombustion type, which has a generally cylindrical precombustion chamber; means for introducing axially into said chamber a fuel to be converted to carbon black; a tunnel, tangentially disposed with respect to and communicating with said precombustion chamber, in which combustion gases are generated and from which said gases are discharged into said chamber; an elongated reaction chamber, axially disposed with respect to and in open communication with said precombustion chamber; the improvement which comprises an oil spray means positioned axially and directed downstream in said tunnel, said spray means having a plurality of nozzles positioned adjacent and parallel to each other in a manner to produce interlacing spray cones.

2. In a method of operating a carbon black furnace wherein an oil to be converted to carbon black is axially introduced into a precombustion zone and wherein another oil is introduced into a combustion zone, disposed tangentially with respect to said precombustion zone, and wherein in said tangentially disposed combustion zone, said another oil is substantially converted to hot combustion gases, which are then introduced tangentially to said precombustion zone, and wherein the combustion gases in said precombustion zone rotate around said axially introduced oil, the step of introducing said another oil axially and downstream into said tangentially disposed combustion zone in the form of substantially parallel interlacing spray cones at a feed rate substantially greater than that which would produce unstable combustion, roaring, and resulting excessive grit formation if introduced in the form of a single spray cone.

3. A carbon black furnace comprising, in combination, a substantially cylindrical elongated reaction section, a cylindrical precombustion section of diameter larger than said reaction section, disposed in open communication with and upstream of said reaction section and substantially axially aligned therewith, means for axially introducing an oil to be converted to carbon black to the upstream end of said precombustion section, a tunnel tangentially disposed with respect to said precombustion section for receiving oil and air to be burned therein to form hot combustion gases to be introduced tangentially from said tunnel into said precombustion section, an oil spray means in said tunnel having a plurality of parallel nozzles for spraying interlacing cones of oil particles downstream into said tunnel and means for recovering combustion gases and carbon black from said furnace at the downstream end of said reaction section.

4. A method for producing carbon black which comprises feeding axially an oil to be converted to carbon black into a substantially cylindrical precombustion zone, feeding an oil fuel and air into a combustion zone disposed tangentially to and communicating tangentially with said precombustion zone, feeding the oil fuel to said combustion zone as a plurality of parallel, downstream flowing spray cones adjacent to and interlacing each with the other in said zone at a feed rate substantially greater than that which would produce unstable combustion, roaring, and resulting excessive grit formation if introduced in the form of a single spray cone, burning the sprayed oil in said combustion zone, passing the mass of combustion gases, thus resulting, into said precombustion zone, thus surrounding said axially introduced oil with a rotating mass of hot combustion gases, passing said axially introduced oil and said rotating mass of hot combustion gases into and through an axially disposed reaction zone wherein said gases move in helical manner due to their rotational motion, producing carbon black and combustion products in said reaction zone and recovering said carbon black and combustion products from said reaction zone.

5. A method according to claim 4 wherein the first-mentioned oil is a tar and the oil fuel is an aromatic oil.

6. In a method for increasing throughput of a carbon black furnace of the substantially cylindrical precombustion zone type wherein there are fed tangentially, hot combustion gases into the precombustion zone, wherein there are fed into a combustion zone, tangentially disposed with respect to said precombustion zone, a fuel oil spray and air, producing in said combustion zone the hot combustion gases fed to said precombustion zone, and wherein further increase in the fuel oil fed into said combustion zone results in unstable combustion or in carbon deposits, the step of feeding said oil at a feed rate substantially greater than that which would produce unstable combustion, roaring, and resulting excessive grit formation if introduced in the form of a single spray cone downstream into said combustion zone as a plurality of substantially parallel sprays adjacent to and interlacing each with the other.

7. A furnace according to claim 1 wherein two substantially parallel sprays are provided.

8. A method according to claim 2 wherein two substantially parallel sprays are used.

9. A furnace according to claim 3 wherein two substantially parallel sprays are provided.

10. A method according to claim 4 wherein two substantially parallel sprays are used.

11. A furnace according to claim 1 wherein the nozzle producing each spray has a spray nozzle angle of 60 to 100°.

12. In a carbon black furnace of the precombustion type which has a generally cylindrical precombustion chamber; means for introducing axially into said chamber a fuel to be converted to carbon black; a tunnel, tangentially disposed with respect to and communicating with said precombustion chamber, in which combustion gases are generated and from which said gases are discharged into said chamber; an elongated reaction chamber, axially disposed with respect to and in open communication with said precombustion chamber; the improvement which comprises an oil spray means positioned axially in said tunnel, said spray means having a plurality of nozzles pointed downstream and positioned adjacent each other in a manner to produce parallel interlacing spray cones, and means for supplying a stream of combustion air helically moving about the axis of said plurality of nozzles.

13. A method of operating a carbon black furnace wherein an oil to be converted to carbon black is axially introduced into a precombustion zone and wherein another oil is introduced into a combustion zone in which it is substantially converted to hot combustion gases which are then introduced tangentially to said precombustion zone, and wherein said combustion gases rotate around said axially introduced oil in said precombustion zone, the steps of introducing said another oil axially to said combustion zone at a feed rate substantially greater than that which would produce unstable combustion, roaring, and resulting excessive grit formation if introduced in the form of a single spray cone in the form of interlacing spray cones, and introducing combustion air as a stream moving helically about the axis of said interlacing spray cones.

14. A furnace according to claim 1 wherein said spray means, positioned axially in said tunnel, is comprised essentially of an oil feed pipe and two spray nozzles welded to said pipe as a common feed pipe for said nozzles.

15. A method of operating a carbon black furnace wherein an oil to be converted to carbon black is axially introduced into a precombustion zone and wherein another oil which is an aromatic oil having a Bureau of Mines Correlation Index greater than 36 is introduced into a combustion zone, disposed tangentially with respect to said precombustion zone, and wherein in said tangentially disposed combustion zone, said another oil is substantially converted to hot combustion gases, which are then introduced tangentially to said precombustion zone, and wherein the combustion gases in said precombustion zone rotate around said axially introduced oil, the step of introducing said another oil axially and downstream into said tangentially disposed combustion zone in the form of substantially parallel interlacing spray cones at a feed rate substantially greater than that which would produce unstable combustion, roaring, and resulting excessive grit formation if introduced in the form of a single spray cone.

16. In a method for increasing throughput of a carbon black furnace of the substantially cylindrical precombustion zone type wherein there are fed tangentially, hot combustion gases into the precombustion zone, wherein there are fed into a combustion zone, tangentially disposed with respect to said precombustion zone, a fuel oil spray and air, the fuel oil having a Bureau of Mines Correlation Index greater than 36, producing in said combustion zone the hot combustion gases fed to said precombustion zone, and wherein further increase in the fuel oil fed into said combustion zone results in unstable combustion or in carbon deposits, the step of feeding said oil downstream into said combustion zone as a plurality of substantially parallel sprays adjacent to and interlacing each with the other, the axes of said sprays being substantially parallel with the axis of said combustion zone at a feed rate of 80 to 100 gallons per hour for a 12-inch diameter combustion zone, and at feed rates varying therefrom in direct proportion to the cross-sectional area of the same for other diameter combustion zones said feed rate being substantially greater than that which would produce unstable combustion, roaring and resulting excessive grit formation if introduced in the form of a single spray cone.

17. In a method for increasing throughput of a carbon black furnace of the substantially cylindrical precombustion zone type wherein there are fed tangentially, hot combustion gases into the precombustion zone, wherein there are fed into a combustion zone, tangentially disposed with respect to said precombustion zone, a fuel oil spray and air, the fuel oil having a Bureau of Mines Correlation Index of about 76, producing in said combustion zone the hot combustion gases fed to said precombustion zone, and wherein further increase in the fuel oil fed into said combustion zone results in unstable combustion or in carbon deposits, the step of feeding said oil at a feed rate substantially greater than that which would produce unstable combustion, roaring, and resulting excessive grit formation if introduced in the form of a single spray cone downstream into said combustion zone as a plurality of substantially parallel sprays adjacent to and interlacing each with the other, the axes of said sprays being substantially parallel with the axis of said combustion zone.

References Cited in the file of this patent

UNITED STATES PATENTS

| | | |
|---|---|---|
| 1,184,808 | Anthony | May 30, 1916 |
| 1,565,996 | French | Dec. 15, 1925 |
| 2,641,534 | Krejci | June 9, 1953 |
| 2,781,250 | Miller | Feb. 12, 1957 |